(12) United States Patent
Kondo et al.

(10) Patent No.: US 11,754,195 B2
(45) Date of Patent: Sep. 12, 2023

(54) FLOW CHANNEL SWITCHING VALVE

(71) Applicants: FUJIKOKI CORPORATION, Tokyo (JP); DENSO CORPORATION, Aichi (JP)

(72) Inventors: Daisuke Kondo, Tokyo (JP); Kenichi Mochizuki, Tokyo (JP); Masashi Yamashita, Tokyo (JP); Takamitsu Mano, Aichi (JP)

(73) Assignees: FUJIKOKI CORPORATION, Tokyo (JP); DENSO CORPORATION, Aichi (JP)

( * ) Notice: Subject to any disclaimer, the term of this patent is extended or adjusted under 35 U.S.C. 154(b) by 145 days.

(21) Appl. No.: 17/613,217

(22) PCT Filed: Apr. 27, 2020

(86) PCT No.: PCT/JP2020/017990
§ 371 (c)(1),
(2) Date: Nov. 22, 2021

(87) PCT Pub. No.: WO2020/235312
PCT Pub. Date: Nov. 26, 2020

(65) Prior Publication Data
US 2022/0221079 A1 Jul. 14, 2022

(30) Foreign Application Priority Data
May 22, 2019 (JP) .................. 2019-095810

(51) Int. Cl.
*F16K 27/06* (2006.01)
*F16K 5/06* (2006.01)
*F16K 11/087* (2006.01)

(52) U.S. Cl.
CPC .............. *F16K 27/067* (2013.01); *F16K 5/06* (2013.01); *F16K 11/0873* (2013.01)

(58) Field of Classification Search
CPC ....... F16K 27/067; F16K 5/06; F16K 11/0873
See application file for complete search history.

(56) References Cited

U.S. PATENT DOCUMENTS 3,270,772 A * 9/1966 Rakus ................... F16K 5/0615
137/553
3,531,081 A * 9/1970 Scaramucci .............. F16K 5/02
251/151

(Continued)

FOREIGN PATENT DOCUMENTS

CN 201723764 U * 1/2011
CN 210336735 U * 4/2020

(Continued)

OTHER PUBLICATIONS

PCT, International Search Report for the corresponding application No. PCT/JP2020/017990, dated Aug. 4, 2020, with English translation.

(Continued)

*Primary Examiner* — Angelisa L. Hicks
(74) *Attorney, Agent, or Firm* — LUCAS & MERCANTI, LLP

(57) ABSTRACT

A flow channel switching valve includes a valve stem that is attached to a ball valve member. The flow channel switching valve includes a potentiometer shaft that is press-fitted into an attachment hole provided in an end surface of the valve stem, and a potentiometer that detects a rotation angle of the potentiometer shaft around an axis. The potentiometer shaft has a small-diameter portion, a medium-diameter portion, and a large-diameter portion that are sequentially connected in a direction of the axis, and is supported rotatably around the axis in the attachment hole in an inserted state before being press-fitted into the attachment hole. The large-diameter portion is press-fitted into an upper end portion of the attachment hole.

7 Claims, 10 Drawing Sheets

(56) References Cited

U.S. PATENT DOCUMENTS

| | | | | |
|---|---|---|---|---|
| 5,586,749 | A | * | 12/1996 | Conley ................. F16K 27/067 |
| | | | | 251/315.15 |
| 2004/0007684 | A1 | * | 1/2004 | Dube .................... F16K 41/043 |
| | | | | 251/214 |
| 2008/0060706 | A1 | | 3/2008 | Combs |
| 2019/0162315 | A1 | * | 5/2019 | Matsumura ........... F16K 5/0642 |

FOREIGN PATENT DOCUMENTS

| | | |
|---|---|---|
| DE | 102011101074 A1 | 11/2012 |
| EP | 3892900 A1 | 10/2021 |
| JP | H01-150076 A | 6/1989 |
| JP | 2010-223418 A | 10/2010 |
| JP | 2020-091006 A | 6/2020 |
| WO | 2008/033916 A2 | 3/2008 |

OTHER PUBLICATIONS

PCT, Written Opinion of ISA for the corresponding application No. PCT/JP2020/017990, dated Aug. 4, 2020, with English translation.
China National Intellectual Property Administration, Office Action "First review of the opinion notice," dated Feb. 16, 2023 for the related Chinese Application No. 202080027109.8, and machine English translation (8 pages).

* cited by examiner

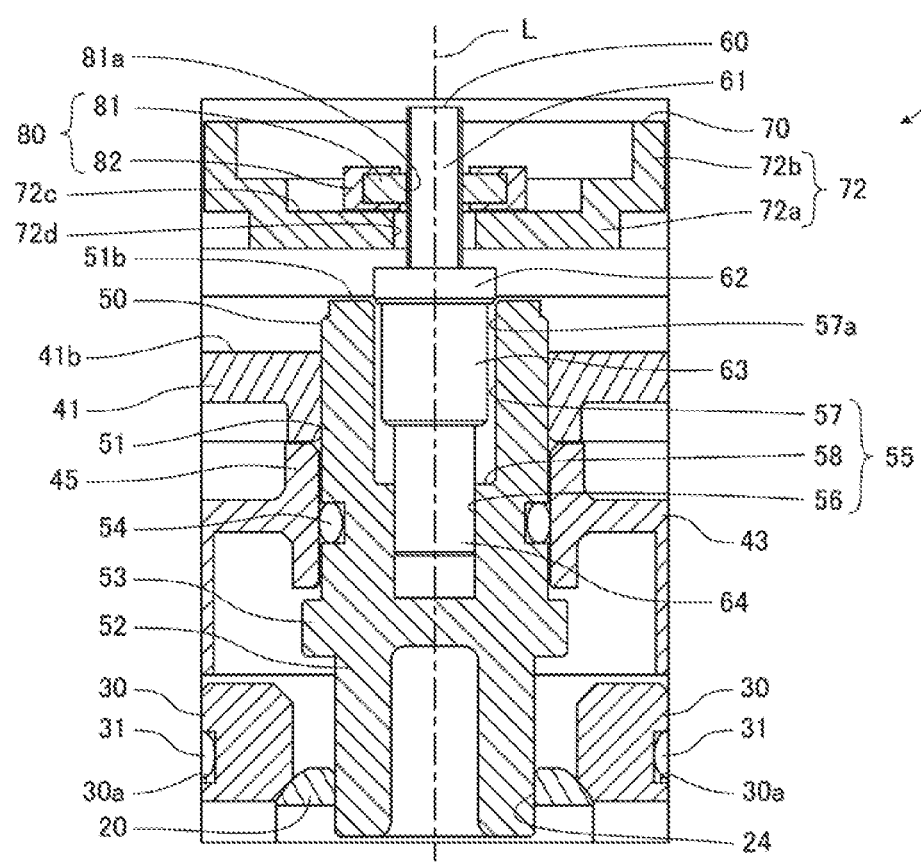
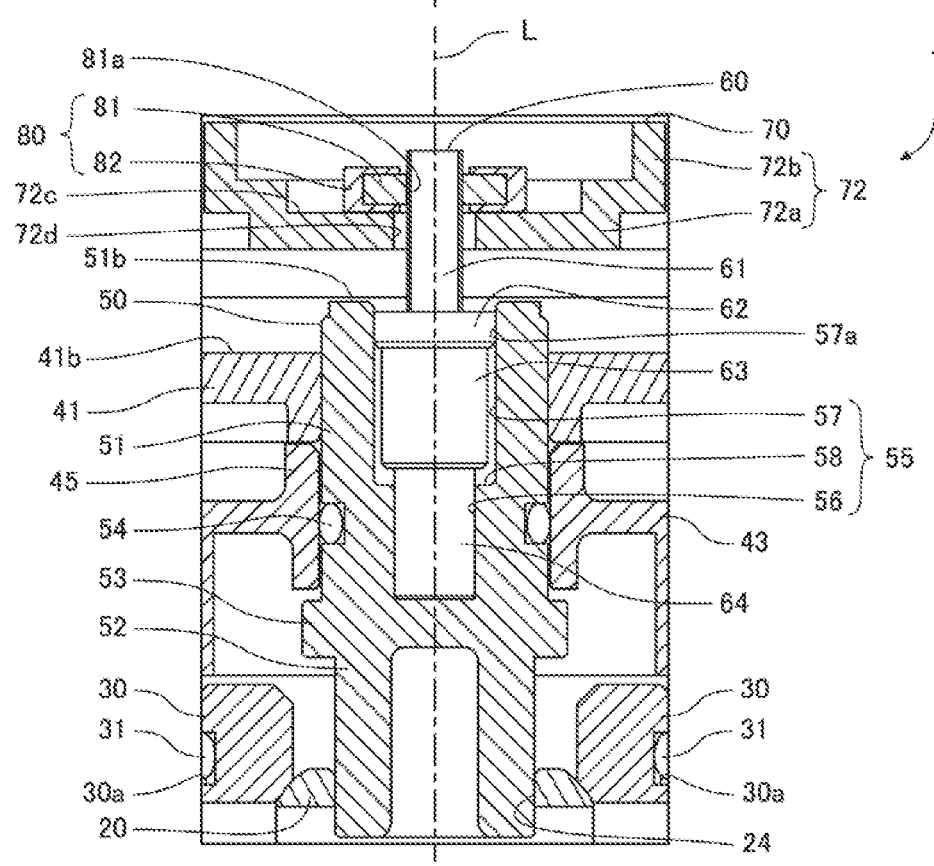

FLOW CHANNEL SWITCHING VALVE

CROSS REFERENCE TO RELATED APPLICATION

This Application is a 371 of PCT/JP2020/017990 filed on Apr. 27, 2020 which, in turn, claimed the priority of Japanese Patent Application No. 2019-095810 filed on May 22, 2019, and both applications are incorporated herein by reference.

TECHNICAL FIELD

The present invention relates to a flow channel switching valve that switches connection of flow channels by rotating a valve member.

BACKGROUND ART

An example of a conventional flow channel switching valve is disclosed in Patent Literature 1. The flow channel switching valve includes a ball valve member and a valve case. The ball valve member has an inflow path and an outflow path. The valve case has a valve chamber in which the ball valve member is rotatably housed, an inlet flow channel communicating with the valve chamber, and a plurality of outlet flow channels communicating with the valve chamber. A valve stem is coupled to the ball valve member, the ball valve member is rotated as the valve stem rotates, and hence the inlet flow channel selectively communicates with one of the plurality of outlet flow channels.

CITATION LIST

Patent Literature

Patent Literature 1: Japanese Unexamined Patent Application Publication No. 2010-223418

SUMMARY OF INVENTION

Technical Problem

In such a flow channel switching valve, the valve stem is combined with a rotation angle sensor, and the rotational position of the valve member is detected based on the output of the rotation angle sensor. However, there has been a possibility that the output of the rotation angle sensor with respect to the rotational position of the valve member includes an error due to accumulation of the tolerances of the valve member, the valve stem, the rotation angle sensor, and so forth. Thus, there has been room for improvement in the precision of the rotational position of the valve member.

Accordingly, an object of the present invention is to provide a flow channel switching valve capable of effectively improving the precision of the rotational position of a valve member.

Solution to Problem

To attain the above-described object, a flow channel switching valve according to an aspect of the present invention is a flow channel switching valve including a valve body provided with a valve chamber and a plurality of flow channels that communicate with the valve chamber, a valve member that is rotatably housed in the valve chamber and that switches connection of the flow channels in accordance with a rotational position, a valve stem that is attached to the valve member along a rotation axis of the valve member, and a drive unit that rotates the valve member via the valve stem. The flow channel switching valve includes a rotation angle output shaft that is press-fitted into an attachment hole provided in an end surface of the valve stem; and a rotation angle detection unit that detects a rotation angle of the rotation angle output shaft around the rotation axis. The rotation angle output shaft has a small-diameter portion, a medium-diameter portion, and a large-diameter portion that are sequentially connected in a direction of the rotation axis, and is supported rotatably around the rotation axis in the attachment hole in an inserted state before being press-fitted into the attachment hole. The attachment hole is provided with a press-fit portion into which one portion of the small-diameter portion, the medium-diameter portion, and the large-diameter portion is press-fitted.

According to the present invention, the rotation angle output shaft has the small-diameter portion, the medium-diameter portion, and the large-diameter portion that are sequentially connected in the direction of the rotation axis. The rotation angle output shaft is supported rotatably around the rotation axis in the attachment hole in the inserted state before being press-fitted into the attachment hole. The attachment hole provided in the valve stem is provided with the press-fit portion into which the one portion of the small-diameter portion, the medium-diameter portion, and the large-diameter portion of the rotation angle output shaft is press-fitted. With this configuration, in the state in which the rotation angle output shaft has been inserted into the attachment hole, the rotation angle output shaft can be rotated around the rotation axis to perform positioning, and can be press-fitted and fixed after the positioning. Accordingly, it is possible to further reduce an error of the output of the rotation angle detection unit due to the tolerances of the valve member, the valve stem, and the rotation angle detection unit. Thus, it is possible to effectively improve the precision of the rotational position of the valve member.

In the present invention, it is preferable that the valve stem be press-fitted into a through hole provided in a gear of the drive unit, and the press-fit portion is provided at a position shifted from the gear in the direction of the rotation axis. With this configuration, it is possible to avoid the influence of deformation of the valve stem (attachment hole) caused by press-fitting of the gear. Accordingly, it is possible to prevent the rotation angle output shaft from being press-fitted in an inclined manner. Thus, it is possible to effectively improve the precision of the rotational position of the valve member.

In the present invention, it is preferable that the attachment hole have a guide portion with which at least one of other portions of the small-diameter portion, the medium-diameter portion, and the large-diameter portion except the portion that is press-fitted into the press-fit portion comes into contact slidably in an axial direction and a circumferential direction. With this configuration, the other portion comes into contact with the guide portion to guide the movement of the rotation angle output shaft. Thus, it is possible to more effectively prevent the rotation angle output shaft from being press-fitted in an inclined manner with respect to the valve stem.

In the present invention, it is preferable that the guide portion be provided to be shifted from the gear in the direction of the rotation axis. With this configuration, it is possible to avoid the influence of deformation of the valve stem (attachment hole) caused by press-fitting of the gear.

Accordingly, it is possible to further effectively prevent the rotation angle output shaft from being press-fitted in an inclined manner.

In the present invention, it is preferable that the guide portion be provided to be shifted in the direction of the rotation axis from a bearing portion that rotatably supports the valve stem. With this configuration, it is possible to avoid the influence of deformation of the valve stem caused by press-fitting of the rotation angle output shaft. Thus, it is possible to prevent the rotation of the valve stem from being hindered and to ensure smooth rotation of the valve member.

In the present invention, it is preferable that the attachment hole be provided with the press-fit portion into which the medium-diameter portion is press-fitted, and two guide portions with which the small-diameter portion and the large-diameter portion come into contact slidably in an axial direction and a circumferential direction. With this configuration, the small-diameter portion and the large-diameter portion come into contact with the two guide portions to guide the movement of the rotation angle output shaft. Thus, it is possible to more effectively prevent the rotation angle output shaft from being press-fitted in an inclined manner with respect to the valve stem.

Advantageous Effects of Invention

According to the present invention, it is possible to effectively improve the precision of the rotational position of the valve member.

BRIEF DESCRIPTION OF DRAWINGS

FIG. 9A is a view for explaining the method of assembling the flow channel switching valve of FIG. 1 and illustrates a state in which the potentiometer shaft has been inserted into the attachment hole of the valve stem (inserted state before being press-fitted).

FIG. 9B is a view for explaining the method of assembling the flow channel switching valve of FIG. 1 and illustrates a state in which the potentiometer shaft has been press-fitted into and fixed to the attachment hole of the valve stem.

FIG. 10A illustrates a state in which the potentiometer shaft has been inserted into the attachment hole of the valve stem (inserted state before being press-fitted).

FIG. 10B illustrates a state in which the potentiometer shaft has been press-fitted into and fixed to the attachment hole of the valve stem.

DESCRIPTION OF EMBODIMENTS

First Embodiment

A configuration of a flow channel switching valve according to a first embodiment of the present invention will be described below with reference to FIGS. 1 to 3.

Figure 1:
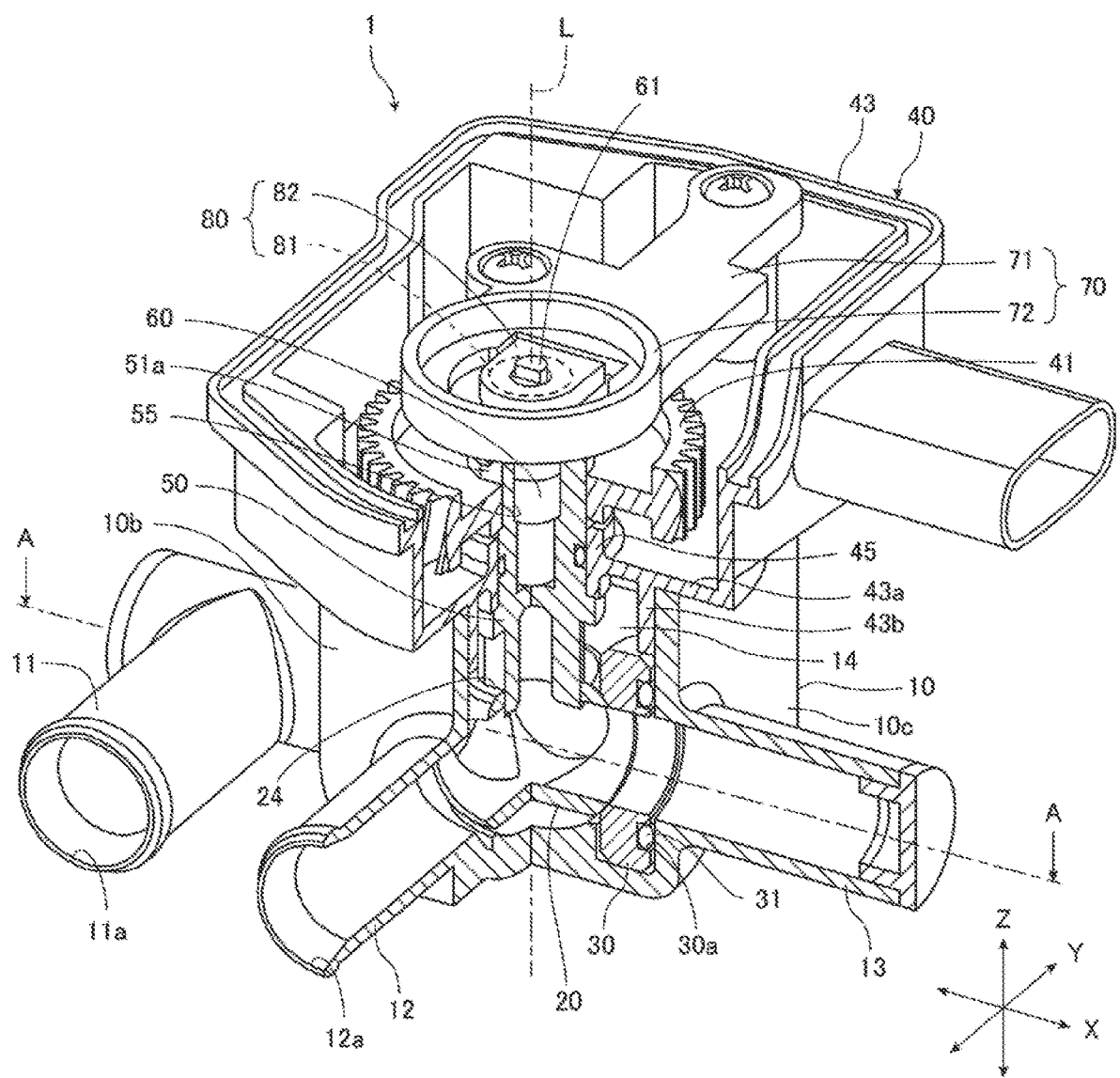
FIG. 1 is a perspective view including a partial section of a flow channel switching valve according to a first embodiment of the present invention.

FIG. 1 is a perspective view including a partial section of the flow channel switching valve according to the first embodiment of the present invention. FIG. 2 is a sectional view taken along line A-A of FIG. 1. FIG. 3 is a six sided view of a ball valve member included in the flow channel switching valve of FIG. 1. In the following description, "upper, lower, left, and right" are used to indicate the relative positional relationship between respective components in each of the drawings, but do not indicate the absolute positional relationship. In each of the drawings, a left-right direction is defined as an X-axis direction, a front-back direction is defined as a Y-axis direction, and an up-down direction is defined as a Z-axis direction. The X axis, the Y axis, and the Z axis are orthogonal to one another.

Figure 2:
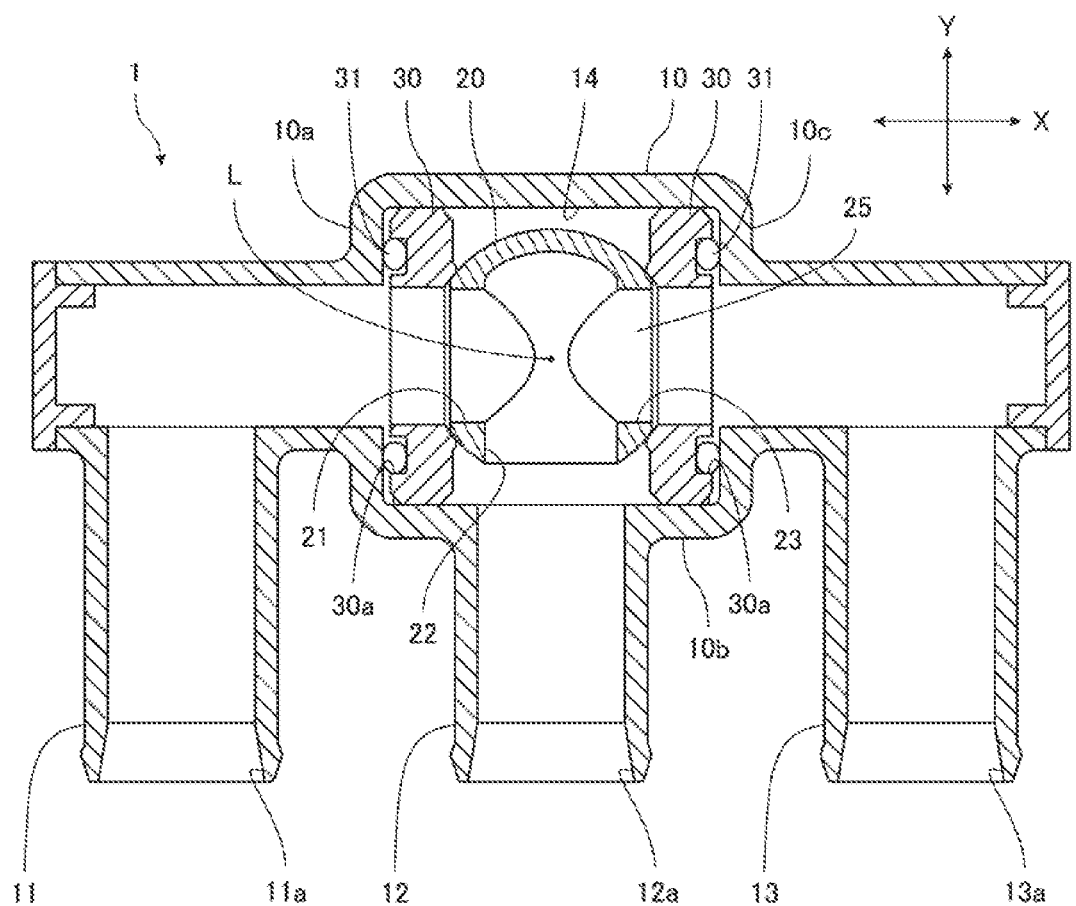
FIG. 2 is a sectional view taken along line A-A of FIG. 1.
Figure 3:
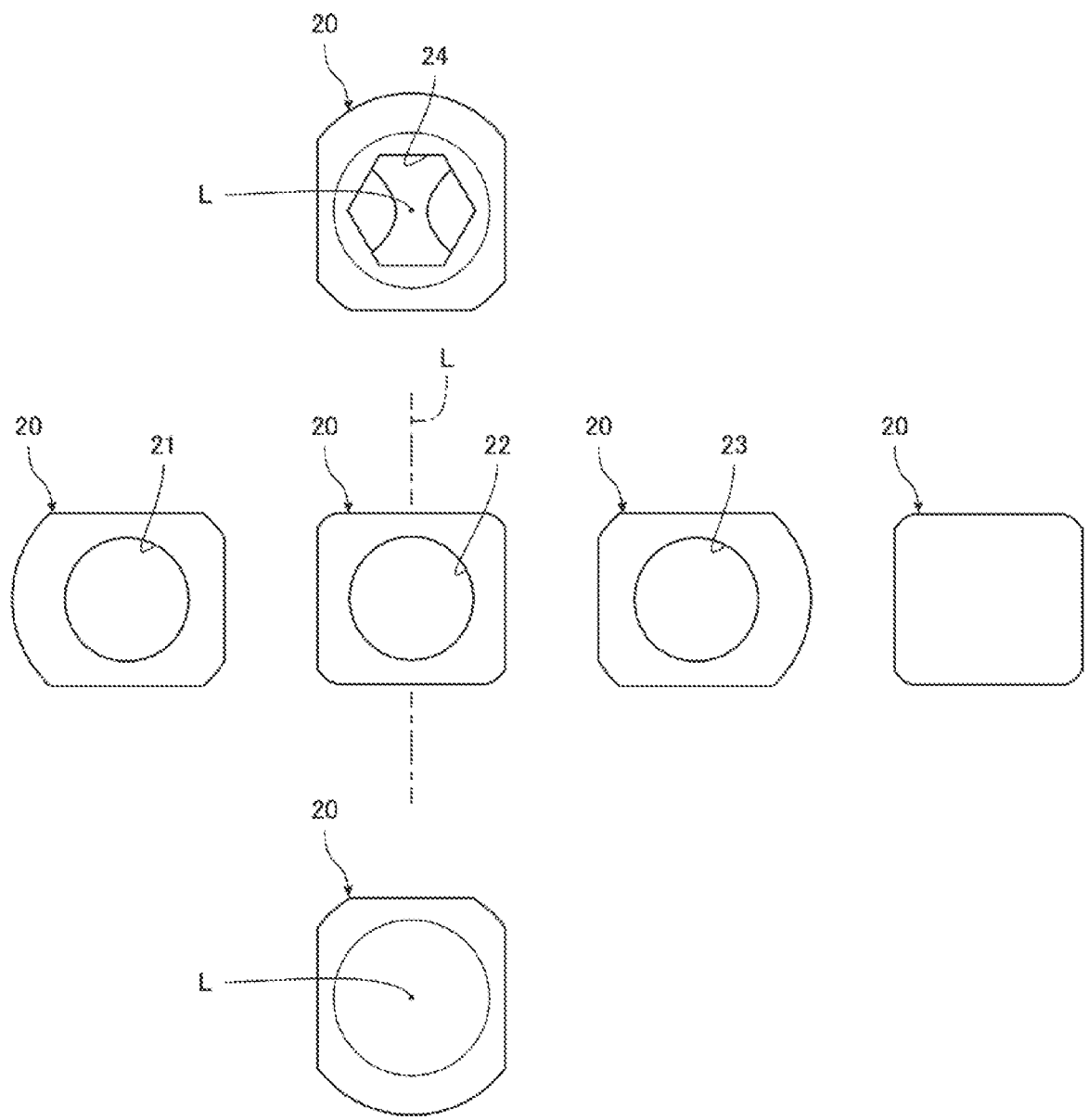
FIG. 3 is a six sided view of a ball valve member included in the flow channel switching valve of FIG. 1.

As illustrated in FIGS. 1 and 2, a flow channel switching valve 1 of the present embodiment includes a valve body 10, a ball valve member 20, seat members 30, 30, sealing members 31, 31, a drive unit 40, and a valve stem 50. The flow channel switching valve 1 also includes a potentiometer shaft 60 that is a rotation angle output shaft, a potentiometer base 70 that is a base body, and a potentiometer 80 that is a rotation angle detection unit.

The valve body 10 is made of synthetic resin and formed in a substantially cubic box shape. A substantially L-shaped first flow channel 11 is provided in a left wall portion 10*a* of the valve body 10. A straight second flow channel 12 is provided in a front wall portion 10*b* of the valve body 10. A substantially L-shaped third flow channel 13 is provided in a right wall portion 10*c* of the valve body 10. The third flow channel is plane-symmetrical to the first flow channel 11. An opening 11*a* of the first flow channel 11, an opening 12*a* of the second flow channel 12, and an opening 13*a* of the third flow channel 13 face the front direction (the forward direction from the paper in FIG. 1, downward in FIG. 2). The first flow channel 11, the second flow channel 12, and the third flow channel 13 communicate with a valve chamber 14 provided in the valve body 10. As the flow channels that communicate with the valve chamber 14, two or four or more flow channels may be provided.

The ball valve member 20 is formed in a hollow ball-like shape (spherical shape). The ball valve member 20 is made of, for example, metal or synthetic resin. The ball valve member 20 is housed in the valve chamber 14. The ball valve member 20 is rotatably supported by the seat members 30, 30 (described later). At the rotational position illustrated in FIG. 2, the ball valve member 20 has a first opening 21 open toward the left side, a second opening 22 open toward the front side, and a third opening 23 open toward the right side. A switching flow path 25 that connects the first opening 21, the second opening 22, and the third opening 23 to one another is provided inside the ball valve member 20. The switching flow path 25 is formed in a substantially T-like shape in plan view. Alternatively, the ball valve member 20 may have, for example, only the first opening 21 and the second opening 22, and may be provided with a switching flow path 25 that is substantially L-shaped in plan view and connects the first opening 21 and the second opening 22 to each other at the rotational position illustrated in FIG. 2. Although the ball valve member 20 is used as a valve member in the present embodiment, a columnar valve member may be used.

The switching flow path 25 is configured to switch the connection of the first flow channel 11, the second flow channel 12, and the third flow channel 13 in accordance with the rotational position. Specifically, the switching flow path 25 connects the first flow channel 11, the second flow channel 12, and the third flow channel 13 to one another when the ball valve member 20 is at the rotational position illustrated in FIG. 2. The switching flow path 25 connects the first flow channel 11 and the second flow channel 12 to each other when the ball valve member 20 is at a rotational position rotated 90 degrees clockwise in plan view from the rotational position illustrated in FIG. 2. The switching flow path 25 connects the second flow channel 12 and the third flow channel 13 to each other when the ball valve member 20 is at a rotational position rotated 90 degrees counterclockwise in plan view from the rotational position illustrated in FIG. 2.

A valve stem insertion hole 24 into which the valve stem 50 (described later) is inserted is provided in an upper portion of the ball valve member 20. The valve stem insertion hole 24 is formed such that the ball valve member 20 rotates around an axis L that is a rotation axis of the ball valve member 20 as the valve stem 50 rotates. Specifically, the valve stem insertion hole 24 is formed in the same shape as the sectional shape (cross-sectional shape) in the direction orthogonal to the axial direction of an angular columnar portion 52 of the valve stem 50. In the present embodiment, the valve stem insertion hole 24 is formed in a regular hexagonal shape (FIG. 3).

The seat members 30, 30 are made of, for example, synthetic resin such as polytetrafluoroethylene (PTFE) and are formed in an annular shape. The seat members 30, 30 form a pair. The seat members 30, 30 are housed in the valve chamber 14. The seat members 30, 30 are disposed to face each other with a gap in the X-axis direction. The seat members 30, 30 rotatably support the ball valve member 20 in the valve chamber 14 with the ball valve member 20 interposed therebetween.

The sealing members 31, 31 each are, for example, an O-ring made of an elastic material such as a rubber material. The sealing member 31 is disposed to be sandwiched in a compressed state between one of the seat members 30 and the left wall portion 10a of the valve body 10. The sealing member 31 is disposed to be sandwiched in a compressed state between the other of the seat members 30 and the right wall portion 10c of the valve body 10. In the present embodiment, the sealing member 31 is mounted in an annular groove 30a provided in the seat member 30. Part of the sealing member 31 protrudes from the annular groove 30a. The sealing members 31, 31 seal gaps between the valve body 10 and the ball valve member 20 together with the seat members 30, 30. Alternatively, the sealing members 31, 31 may be omitted, and seat members 30, 30 made of an elastic material such as a rubber material and also having a function of a sealing member may be employed.

The drive unit 40 includes a drive mechanism, a lower case 43, and an upper case (not illustrated). The drive mechanism includes a combination of a motor (not illustrated) and a speed reducer that includes a gear 41. The lower case 43 and the upper case are made of resin and in which the drive mechanism is housed. The upper case is attached to the lower case 43 by an attachment structure such as a screwing structure or a snap-fit structure. The drive unit 40 rotates the ball valve member 20 around the axis L via the valve stem 50 (described later).

The lower case 43 integrally has a circular tubular bearing portion 45 at the center of a bottom wall 43a. The valve stem 50 is inserted into the bearing portion 45. The bearing portion 45 rotatably supports the valve stem 50. An inner peripheral wall portion 43b having a quadrangular tubular shape is provided on the bottom wall 43a of the lower case 43. The inner peripheral wall portion 43b is disposed inside the valve body 10 and combined with an upper end portion of the valve body 10. The inner peripheral wall portion 43b and the valve body 10 are joined (in the present embodiment, ultrasonically welded). Alternatively, the lower case 43 and the valve body 10 may be assembled with each other by a screwing structure or the like.

The valve stem 50 is made of synthetic resin and is formed in a columnar shape extending straight as a whole. The valve stem 50 includes a circular columnar portion 51 and the angular columnar portion 52 coaxially connected to a lower end of the circular columnar portion 51. The valve stem 50 is disposed along the axis L.

The circular columnar portion 51 has an annular stopper portion 53 provided at a lower end portion of the circular columnar portion 51 and protruding radially outward. The stopper portion 53 is formed to have an outer diameter larger than the inner diameter of the bearing portion 45.

Moreover, the circular columnar portion 51 has a groove provided in the lower end portion over the entire circumference at a position above the stopper portion 53. An annular O-ring 54 made of a rubber material or the like is fitted to the groove. The circular columnar portion 51 is inserted into the bearing portion 45. The circular columnar portion 51 is rotatably supported by the bearing portion 45. The outer diameter of the circular columnar portion 51 is slightly smaller than the inner diameter of the bearing portion 45. When the circular columnar portion 51 is inserted into the bearing portion 45, the O-ring 54 seals a gap between the valve stem 50 and the bearing portion 45. The sealing with the O-ring 54 prevents the fluid in the valve chamber 14 from leaking to the outside.

The gear 41 of the drive mechanism of the drive unit 40 is press-fitted onto an upper end portion of the circular columnar portion 51. Specifically, the circular columnar portion 51 is press-fitted into a through hole 41a provided at the center of the gear 41. Part of the circular columnar portion 51 protrudes from an upper surface 41b of the gear 41. Moreover, the upper end portion of the circular columnar portion 51 is provided with a planar portion 51a for preventing the press-fitted gear 41 from slipping. The gear 41 may be attached to the valve stem 50 by a method other than press-fitting.

The angular columnar portion 52 is formed in a columnar shape having a regular hexagonal cross-sectional shape. The angular columnar portion 52 is inserted into the valve stem insertion hole 24 of the ball valve member 20, and is attached to the ball valve member 20 along the axis L. The axis L of the ball valve member 20 serves as a rotation axis of the valve stem 50. The valve stem 50 is rotated around the axis L as the gear 41 rotates. The valve stem insertion hole 24 is formed in the same regular hexagonal shape as the cross-sectional shape of the angular columnar portion 52. Thus, the valve stem insertion hole 24 and the angular columnar portion 52 are fitted to each other. The ball valve member 20 is rotated around the axis L as the valve stem 50 rotates. The angular columnar portion 52 is formed to have an outer diameter smaller than that of the stopper portion 53.

The angular columnar portion 52 may have a polygonal columnar shape such as a triangular columnar shape or a quadrangular columnar shape, or a columnar shape having a D-shaped section in which part of the side surface of a circular column is formed as a plane, other than the regular hexagonal shape. In this case, the valve stem insertion hole 24 is also formed in the same shape as the cross-sectional shape of the angular columnar portion 52.

Moreover, an attachment hole 55 is provided at the center of an upward facing end surface 51b of the circular columnar portion 51. The attachment hole 55 has a substantially circular columnar inner space along the axis L. The attachment hole 55 has an attachment hole lower portion 56 and an attachment hole upper portion 57 coaxially connected to the upper side of the attachment hole lower portion 56 (FIG. 9). The attachment hole lower portion 56 and the attachment hole upper portion 57 have circular cross-sectional shapes. The attachment hole 55 is formed such that the diameter of the attachment hole lower portion 56 is smaller than the diameter of the attachment hole upper portion 57. A step portion 58 is provided between the attachment hole lower portion 56 and the attachment hole upper portion 57.

The attachment hole lower portion 56 is provided to be shifted from the gear 41 in the direction of the axis L. In the present embodiment, the attachment hole lower portion 56 is provided to be disposed on the radially inner side of the bearing portion 45. An upper end portion 57a of the attachment hole upper portion 57 is located above the upper surface 41b of the gear 41. That is, the upper end portion 57a is a portion provided to be shifted from the bearing portion 45 and the gear 41 in the direction of the axis L.

The upper end portion 57a of the attachment hole upper portion 57 is a press-fit portion into which a large-diameter portion 62 of the potentiometer shaft 60 (described later) is press-fitted. The attachment hole lower portion 56 is a guide portion with which a small-diameter portion 64 comes into contact slidably in the axial direction (the direction of the axis L that is also the insertion direction of the potentiometer shaft 60 into the attachment hole 55) and the circumferential direction (the direction around the axis L).

The potentiometer shaft 60 is made of metal such as stainless steel or brass, or synthetic resin such as polyphenylene sulfide (PPS). The potentiometer shaft 60 is a separate component from the valve stem 50. The potentiometer shaft 60 is press-fitted into the attachment hole 55 of the valve stem 50. The potentiometer shaft 60 is fixedly attached coaxially to the valve stem 50 by press-fitting. The potentiometer shaft 60 includes a fitting shaft portion 61, the large-diameter portion 62, a medium-diameter portion 63, and the small-diameter portion 64 sequentially from the upper side to the lower side in the axial direction of the potentiometer shaft 60. In other words, the small-diameter portion 64, the medium-diameter portion 63, and the large-diameter portion 62 are sequentially connected in the direction of the axis L from the ball valve member 20 side toward the gear 41 side.

The fitting shaft portion 61 is formed in a columnar shape (so-called D-cut shape) having a D-shaped section in which part of the side surface of a circular column is formed as a plane. The fitting shaft portion 61 is provided at one end portion of the potentiometer shaft 60, and is fitted to a rotor 81 of the potentiometer 80 (described later). At least the distal end of the fitting shaft portion 61 protrudes from the attachment hole 55. The large-diameter portion 62 is formed in a circular columnar shape. The large-diameter portion 62 has a diameter larger than the diameter of the attachment hole upper portion 57 of the attachment hole 55. The medium-diameter portion 63 is formed in a circular columnar shape. The medium-diameter portion 63 has a diameter smaller than the diameter of the large-diameter portion 62 and the diameter of the attachment hole upper portion 57 and larger than the diameter of the small-diameter portion 64. The medium-diameter portion 63 connects the large-diameter portion 62 and the small-diameter portion 64. The small-diameter portion 64 is formed in a circular columnar shape. The small-diameter portion 64 has the same diameter (including substantially the same diameter) as the diameter of the attachment hole lower portion 56 of the attachment hole 55.

The potentiometer base 70 is made of synthetic resin. The potentiometer base 70 integrally has a base body portion 71 and a meter attachment portion 72. The base body portion 71 is formed in a substantially flat plate shape. The base body portion 71 is fixed to bosses 43c, 43c protruding upward from the bottom wall 43a of the lower case 43 by screws 78, 78. The meter attachment portion 72 has a disk-shaped bottom wall portion 72a and a peripheral wall portion 72b standing upward from the peripheral edge of the bottom wall portion 72a. A recess 72c is provided at the center of the bottom wall portion 72a. The recess 72c is a portion to which the potentiometer 80 (described later) is attached. Moreover, a through hole 72d is provided in the recess 72c. The fitting shaft portion 61 of the potentiometer shaft 60 is passed through the through hole 72d. The diameter of the through hole 72d is larger than the diameter of the fitting shaft portion 61.

The potentiometer 80 is a rotation angle sensor for detecting a rotation angle. The potentiometer 80 has the disk-shaped rotor 81 and a meter body portion 82. The meter body portion 82 rotatably supports the rotor 81. The meter body portion 82 is a signal output unit that outputs a signal (voltage) corresponding to the rotation angle of the rotor 81. A fitting hole 81a having a D-like shape in plan view is provided at the center of the rotor 81. The fitting shaft portion 61 of the potentiometer shaft 60 passes through the fitting hole 81a. The fitting shaft portion 61 is fitted to the fitting hole 81a so that the rotor 81 rotates together with the fitting shaft portion 61. Rotation of the fitting shaft portion 61 makes the rotor 81 rotating. Thus, the potentiometer 80 detects the rotation angle of the potentiometer shaft 60 around the axis L.

In the flow channel switching valve 1, the rotation of the motor of the drive unit 40 is output to the valve stem 50 through the gear 41. The valve stem 50 is rotated around the axis L. The ball valve member 20 is rotated around the axis L as the valve stem 50 rotates, and is positioned at each rotational position. Thus, the connection of the flow channels corresponding to the rotational position is provided. Moreover, the potentiometer shaft 60 is rotated around the axis L together with the valve stem 50. A signal corresponding to the rotation angle of the potentiometer shaft 60 is output from the potentiometer 80. The rotational position of the ball valve member 20 can be monitored based on the signal output from the potentiometer 80.

Next, an example of a method of assembling the flow channel switching valve 1 of the present embodiment will be described with reference to FIGS. 4 to 9.

FIGS. 4 to 9 are views for explaining a method of assembling the flow channel switching valve of FIG. 1, and are, sequentially, (1) a perspective view illustrating a state in which a gear is about to be attached after a valve stem is attached to a valve member, (2) a perspective view illustrating a state in which a potentiometer shaft is about to be inserted into an attachment hole of the valve stem, (3) a perspective view illustrating a state in which a potentiometer base is about to be fixed to a valve body, (4) a perspective view illustrating a state in which a potentiometer is about to be attached to the potentiometer base, (5) a perspective view illustrating a state in which the position of the potentiometer shaft is adjusted after the potentiometer is attached to the potentiometer base, and (6) a sectional view illustrating a state in which the potentiometer shaft is press-fitted into the attachment hole of the valve stem. FIG. 9A illustrates a state in which the potentiometer shaft has been inserted into the attachment hole of the valve stem (inserted state before being press-fitted), and FIG. 9B illustrates a state in which the potentiometer shaft has been press-fitted into and fixed to the attachment hole of the valve stem.

First, the ball valve member 20, the seat members 30, 30, and the sealing members 31, 31 are housed in the valve chamber 14 of the valve body 10. Then, a jig (not illustrated) is inserted from the second flow channel 12 to position the ball valve member 20. The angular columnar portion 52 of the valve stem 50 is inserted into the valve stem insertion hole 24 to attach the valve stem 50 to the ball valve member 20. In this state, the valve stem 50 is disposed along the axis L (Z-axis direction). Then, the valve body 10 and the lower case 43 are assembled with each other while the circular columnar portion 51 of the valve stem 50 is inserted into the bearing portion 45. Ultrasonic waves are applied to the lower case 43 to ultrasonically weld the lower case 43 to the valve body 10.

Figure 4:
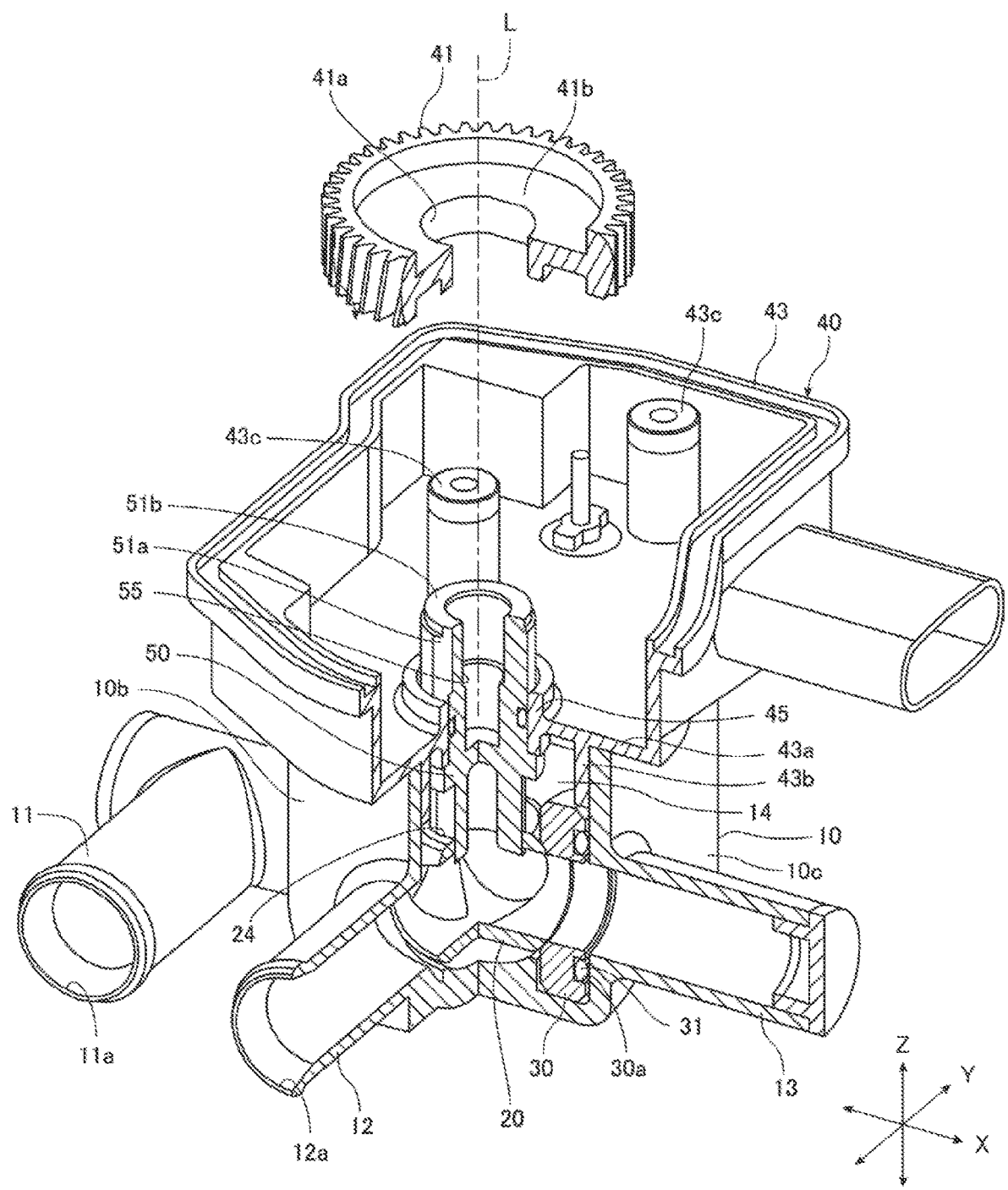
FIG. 4 is a view for explaining a method of assembling the flow channel switching valve of FIG. 1 and illustrates a state in which a gear is about to be attached after a valve stem is attached to the valve member.

Next, as illustrated in FIG. 4, the circular columnar portion 51 of the valve stem 50 is press-fitted into the gear 41, and other components (not illustrated) constituting the drive mechanism are assembled with the lower case 43.

Figure 5:
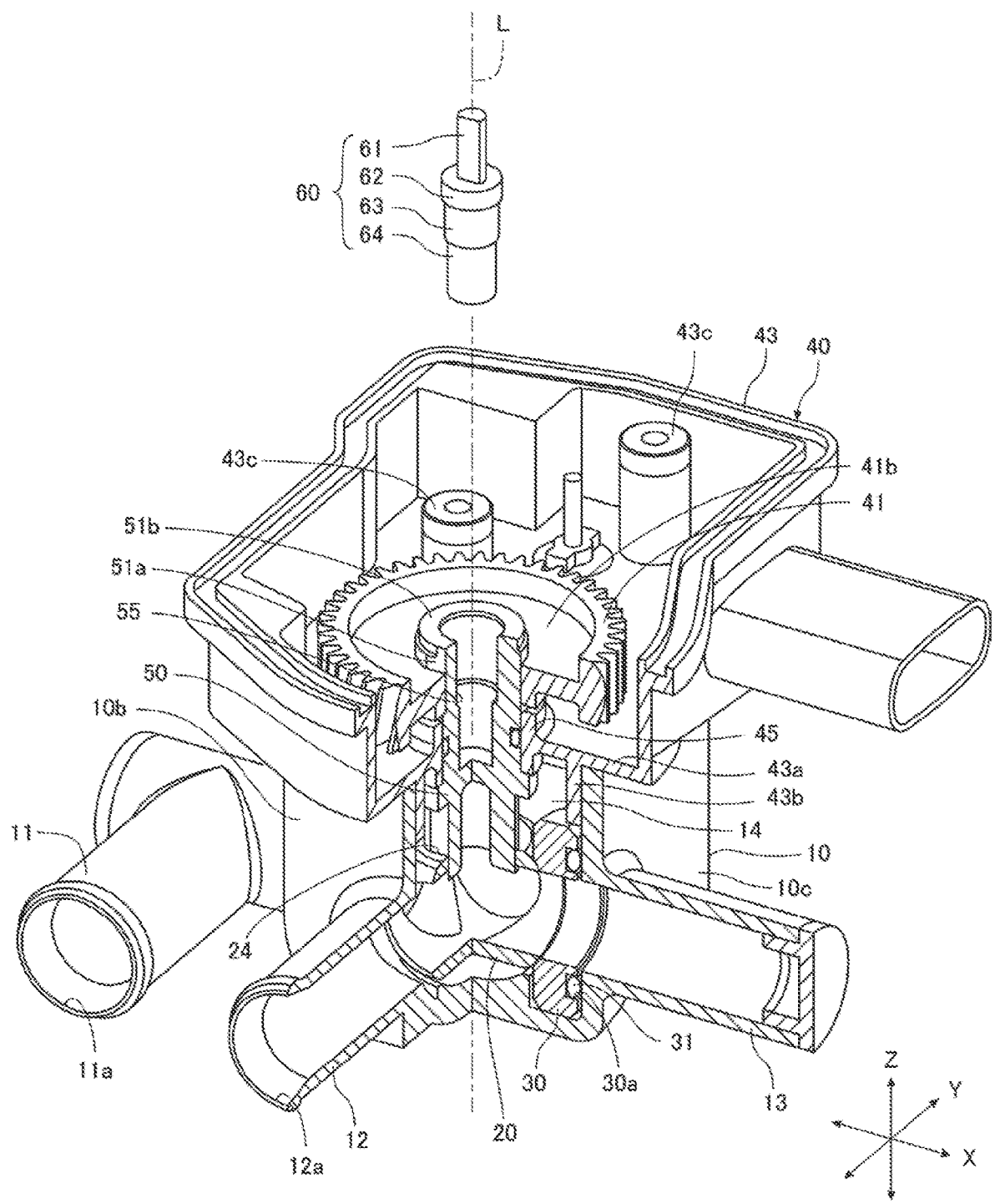
FIG. 5 is a view for explaining the method of assembling the flow channel switching valve of FIG. 1 and illustrates a state in which a potentiometer shaft is about to be inserted into an attachment hole of the valve stem.

Next, as illustrated in FIG. 5, the potentiometer shaft 60 is inserted into the attachment hole 55 of the valve stem 50. Specifically, the potentiometer shaft 60 is inserted into the attachment hole 55 from the small-diameter portion 64, and the medium-diameter portion 63 is inserted into the attachment hole 55 following the small-diameter portion 64. The diameter of the small-diameter portion 64 of the potentiometer shaft 60 is the same as the diameter of the attachment hole lower portion 56. The outer peripheral surface of the small-diameter portion 64 comes into contact with the inner peripheral surface of the attachment hole lower portion 56 slidably in the insertion direction and the circumferential direction. As described above, since the small-diameter portion 64 and the attachment hole lower portion 56 are provided, it is possible to prevent the potentiometer shaft 60 from being inserted in an inclined manner with respect to the valve stem 50. The potentiometer shaft 60 is guided coaxially with the valve stem 50 along the axis L. Then, the potentiometer shaft 60 is further inserted until the large-diameter portion 62 abuts against the end surface 51b of the valve stem 50. At this time, the potentiometer shaft 60 is in the inserted state before being press-fitted. The fitting shaft portion 61 and the large-diameter portion 62 of the potentiometer shaft 60 protrude from the attachment hole 55.

Figure 6:
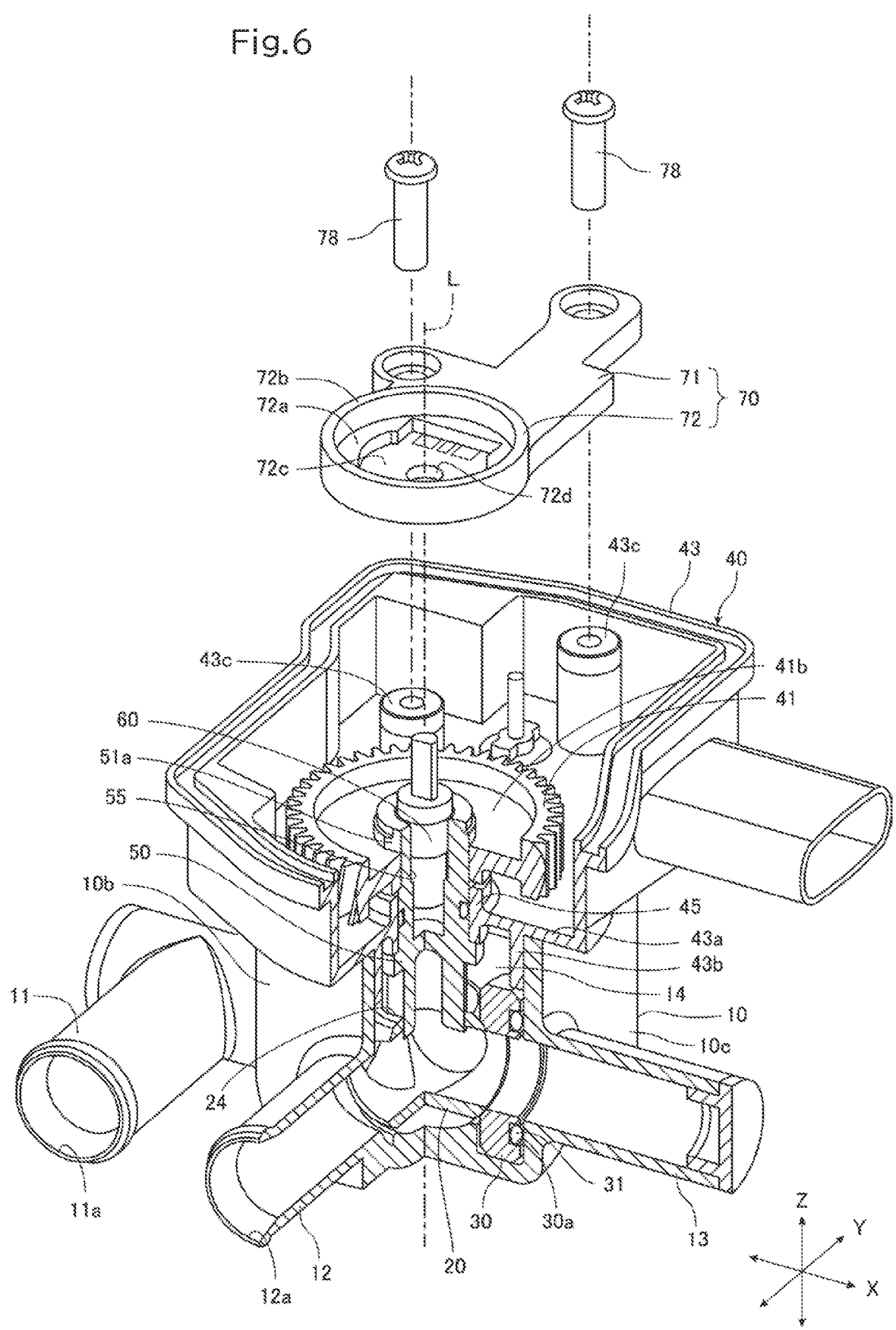
FIG. 6 is a view for explaining the method of assembling the flow channel switching valve of FIG. 1 and illustrates a state in which a potentiometer base is about to be fixed to a valve body.

Next, as illustrated in FIG. 6, the fitting shaft portion 61 of the potentiometer shaft 60 is passed through the through hole 72d provided in the meter attachment portion 72 of the potentiometer base 70. The potentiometer base 70 is disposed on the bosses 43c, 43c of the lower case 43. Then, the screws 78, 78 are screwed into the bosses 43c, 43c to fix the potentiometer base 70 to the lower case 43. The lower case 43 is joined to the valve body 10 by ultrasonic welding. Thus, the potentiometer base 70 is fixed with respect to the valve body 10.

Figure 7:
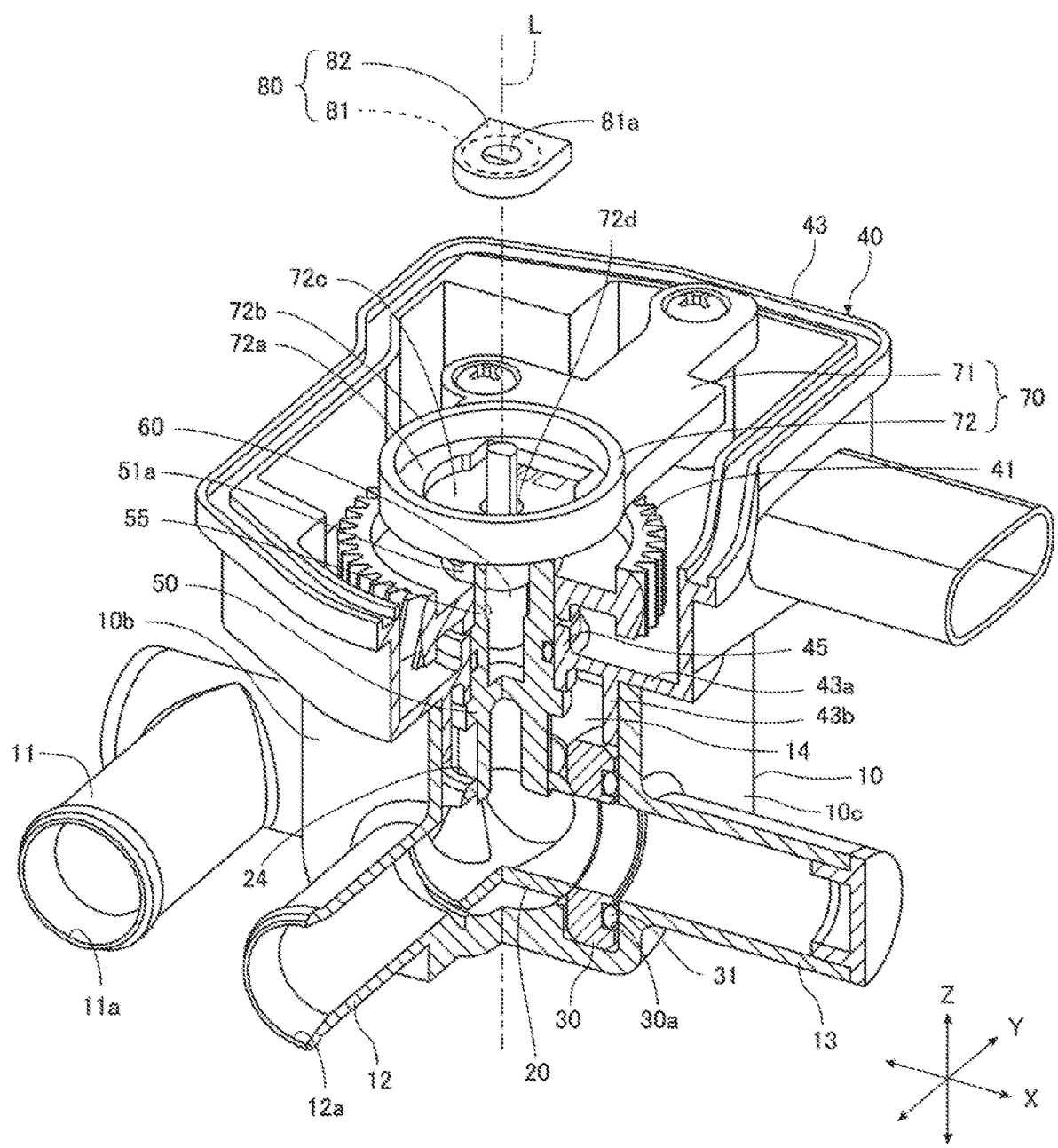
FIG. 7 is a view for explaining the method of assembling the flow channel switching valve of FIG. 1 and illustrates a state in which a potentiometer is about to be attached to the potentiometer base.

Next, as illustrated in FIG. 7, the fitting shaft portion 61 of the potentiometer shaft 60 is passed through the fitting hole 81a provided in the rotor 81 of the potentiometer 80, and the fitting shaft portion 61 is fitted to the fitting hole 81a. The potentiometer 80 is disposed in the recess 72c of the meter attachment portion 72 of the potentiometer base 70. The potentiometer 80 is attached and fixed by soldering or the like. Alternatively, the potentiometer base 70 may be fixed to the lower case 43 after the potentiometer 80 is attached to the potentiometer base 70.

Figure 8:
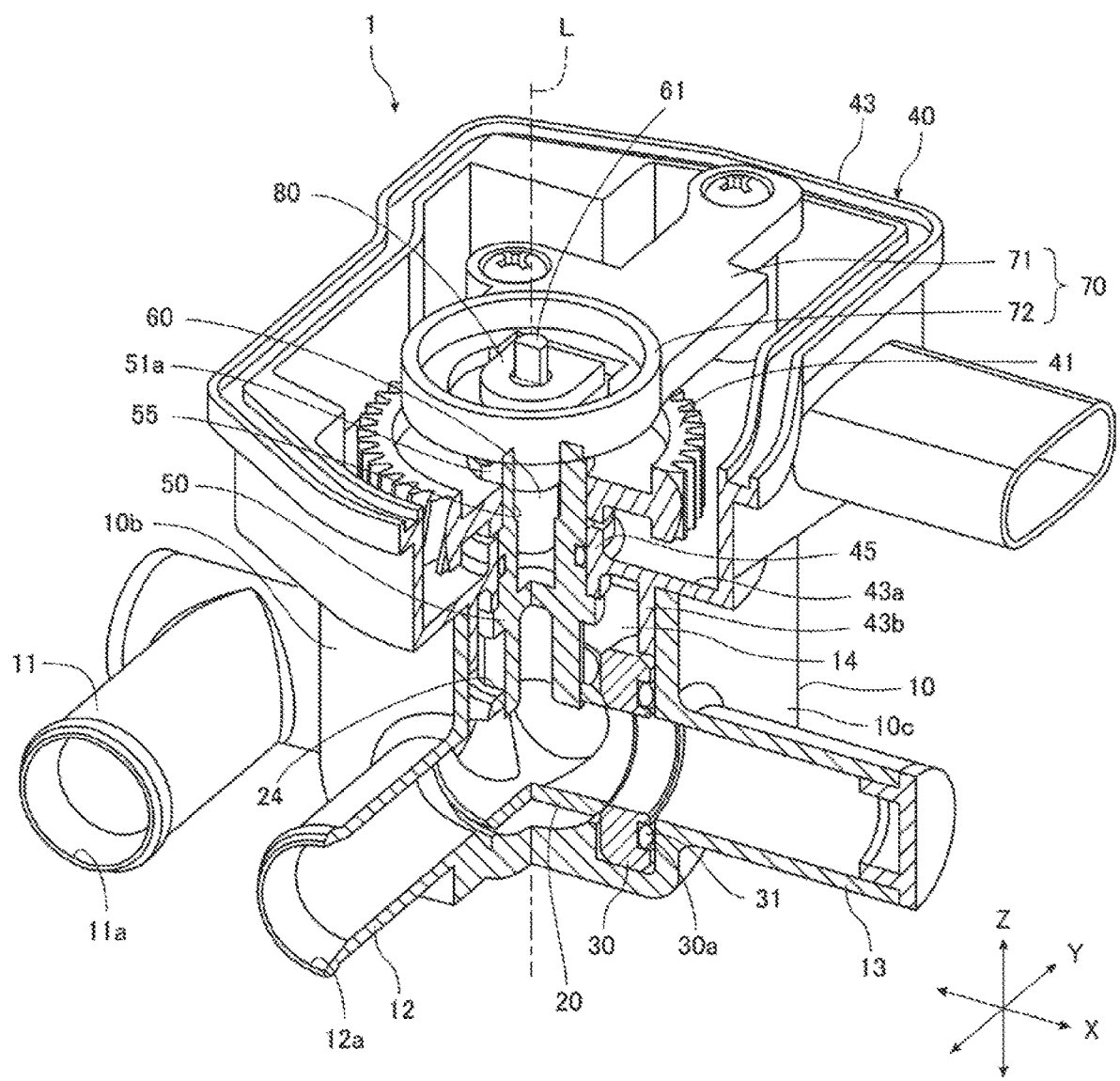
FIG. 8 is a view for explaining the method of assembling the flow channel switching valve of FIG. 1 and illustrates a state in which the position of the potentiometer shaft is adjusted after the potentiometer is attached to the potentiometer base.

Next, the potentiometer shaft 60 is positioned around the axis L. As illustrated in FIGS. 8 and 9A, the potentiometer shaft 60 has been fitted to the fitting hole 81a of the rotor 81. Positioning of the potentiometer shaft 60 around the axis L is performed by rotating the potentiometer shaft 60 around the axis L in the attachment hole 55 so that a correct signal is output from the potentiometer 80 with respect to the rotational position of the ball valve member 20. After the positioning of the potentiometer shaft 60 is completed, as illustrated in FIG. 9B, the potentiometer shaft 60 is further inserted and pushed downward. In this manner, the large-diameter portion 62 of the potentiometer shaft 60 is press-fitted into the attachment hole upper portion 57 of the attachment hole 55. The potentiometer shaft 60 is fixed to the valve stem 50 in the state in which the potentiometer shaft 60 has been positioned. Specifically, the large-diameter portion 62 is press-fitted into the upper end portion 57a of the attachment hole upper portion 57. Thus, the potentiometer shaft 60 is fixed to the upper end portion 57a by press-fitting.

Finally, the upper case (not illustrated) is attached to the lower case 43 to complete the flow channel switching valve 1.

As described above, according to the flow channel switching valve 1 of the present embodiment, the potentiometer shaft 60 has the small-diameter portion 64, the medium-diameter portion 63, and the large-diameter portion 62 that are sequentially connected in the direction of the axis L from the ball valve member 20 side. The potentiometer shaft 60 is supported rotatably around the axis L in the attachment hole 55 in the inserted state before being press-fitted into the attachment hole 55. The attachment hole 55 provided in the valve stem 50 is provided with the upper end portion 57a of the attachment hole upper portion 57 serving as the press-fit portion into which the large-diameter portion 62 of the potentiometer shaft 60 is press-fitted. With this configuration, in the flow channel switching valve 1, in the state in which the potentiometer shaft 60 has been inserted into the attachment hole 55, the potentiometer shaft 60 can be rotated around the axis L to perform positioning, and can be press-fitted and fixed after the positioning. Accordingly, it is possible to further reduce an error of the output of the potentiometer 80 due to the tolerances of the ball valve member 20, the valve stem 50, and the potentiometer shaft

60. Thus, it is possible to effectively improve the precision of the rotational position of the ball valve member 20.

Moreover, the potentiometer shaft 60 is press-fitted into the upper end portion 57a of the attachment hole 55 of the valve stem 50, the upper end portion 57a being shifted from the bearing portion 45 and the gear 41 in the direction of the axis L. Thus, in the flow channel switching valve 1, it is possible to avoid the influence of deformation of the valve stem 50 caused by press-fitting of the potentiometer shaft 60. For example, it is possible to avoid excessive compression of the O-ring 54 or contact of the valve stem 50 with the bearing portion 45 due to deformation of the valve stem 50 such that the diameter thereof increases. Thus, it is possible to prevent the rotation of the valve stem 50 from being hindered and to ensure smooth rotation of the ball valve member 20. Moreover, it is possible to avoid the influence of deformation of the valve stem 50 (attachment hole 55) caused by press-fitting of the gear 41. Accordingly, it is possible to prevent the potentiometer shaft 60 from being press-fitted in an inclined manner. Thus, it is possible to effectively improve the precision of the rotational position of the ball valve member 20.

Moreover, the attachment hole 55 has the attachment hole lower portion 56 with which the small-diameter portion 64 of the potentiometer shaft 60 comes into contact slidably in the axial direction (the direction of the axis L) and the circumferential direction (the direction around the axis L). The attachment hole lower portion 56 is provided to be shifted from the gear 41 in the direction of the axis L. With this configuration, in the flow channel switching valve 1, it is possible to avoid the influence of deformation of the valve stem 50 (attachment hole 55) caused by press-fitting of the gear 41. Accordingly, it is possible to prevent the potentiometer shaft 60 from being press-fitted in an inclined manner, and it is possible to effectively improve the precision of the rotational position of the ball valve member 20.

In the flow channel switching valve 1 of the present embodiment, the small-diameter portion 64 provided near the lower end of the potentiometer shaft 60 is guided by the attachment hole lower portion 56, and the large-diameter portion 62 provided near the upper end of the potentiometer shaft 60 is press-fitted into the upper end portion 57a of the attachment hole upper portion 57. However, the present invention is not limited thereto. That is, the attachment hole 55 (the attachment hole lower portion 56 and the attachment hole upper portion 57) of the valve stem 50 and the potentiometer shaft 60 may have any configurations as long as the configurations do not impair the object of the present invention.

Second Embodiment

A configuration of a flow channel switching valve according to a second embodiment of the present invention will be described below with reference to FIG. 10.

Figure 10A:
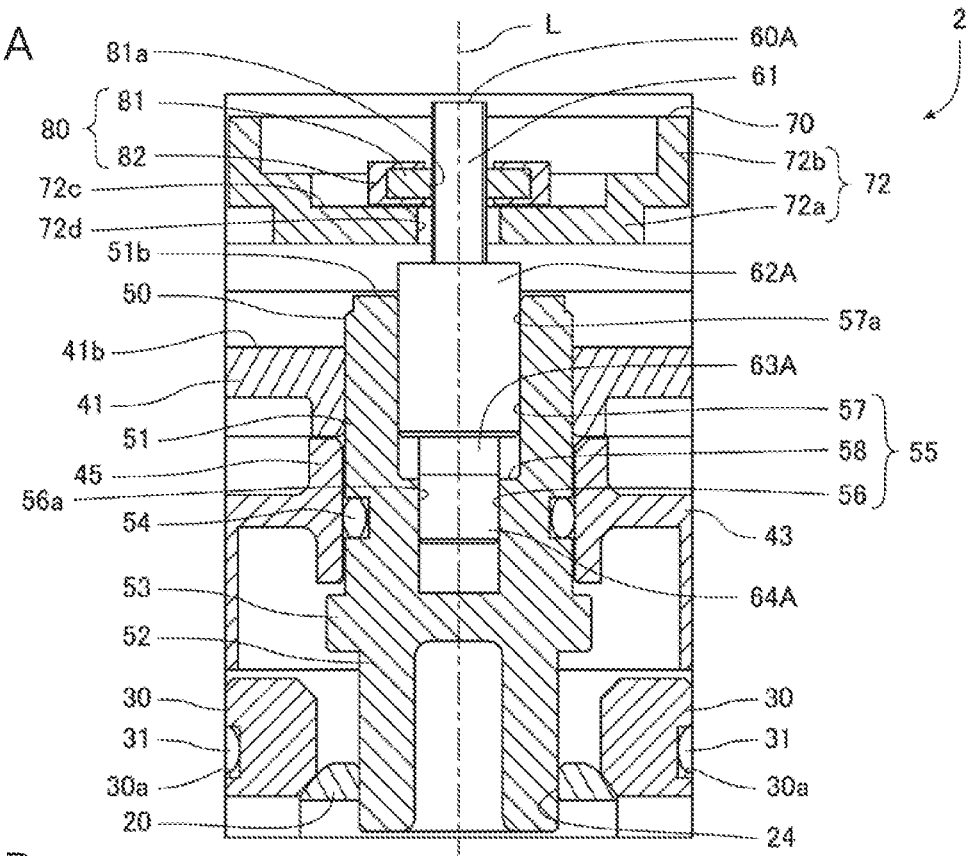
FIG. 10A is a view illustrating a flow channel switching valve according to a second embodiment of the present invention.
Figure 10B:
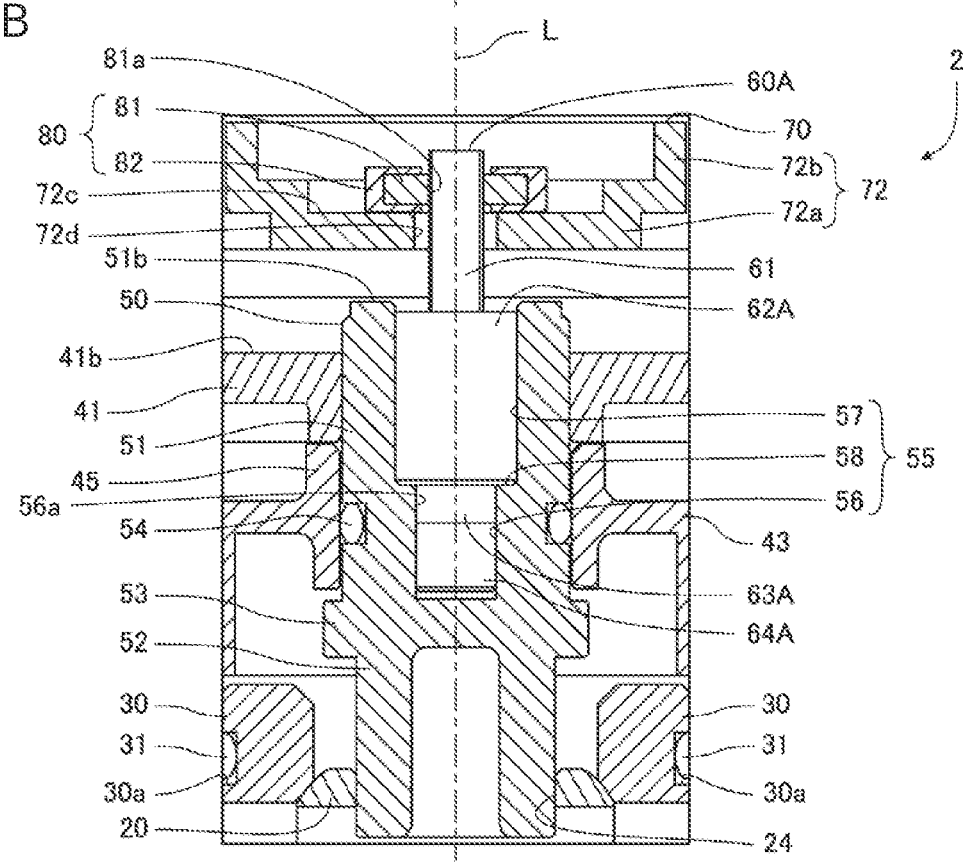
FIG. 10B is a view illustrating a flow channel switching valve according to a second embodiment of the present invention.

FIG. 10 is a view illustrating the flow channel switching valve according to the second embodiment of the present invention. FIG. 10 is a sectional view illustrating a state in which a potentiometer shaft is press-fitted into an attachment hole of a valve stem. FIG. 10A illustrates a state in which the potentiometer shaft has been inserted into the attachment hole of the valve stem (inserted state before being press-fitted), and FIG. 10B illustrates a state in which the potentiometer shaft has been press-fitted into and fixed to the attachment hole of the valve stem.

A flow channel switching valve 2 of the present embodiment has the same configuration as that of the flow channel switching valve 1 of the above-described first embodiment except that the flow channel switching valve 2 includes a potentiometer shaft 60A having a configuration different from that of the potentiometer shaft 60 instead of the potentiometer shaft 60. In the flow channel switching valve 2, the same components as those of the flow channel switching valve 1 described above are denoted by the same reference signs, and the description thereof will be omitted.

The potentiometer shaft 60A includes a fitting shaft portion 61, a large-diameter portion 62A, a medium-diameter portion 63A, and a small-diameter portion 64A sequentially from the upper side to the lower side in the axial direction thereof. In other words, the small-diameter portion 64A, the medium-diameter portion 63A, and the large-diameter portion 62A are sequentially connected in the direction of the axis L from the ball valve member 20 side toward the gear 41 side.

The large-diameter portion 62A is formed in a circular columnar shape. The large-diameter portion 62A has the same diameter (including substantially the same diameter) as the diameter of the attachment hole upper portion 57 of the attachment hole 55. The medium-diameter portion 63A is formed in a circular columnar shape. The medium-diameter portion 63A has a diameter smaller than the diameter of the large-diameter portion 62A and the diameter of the attachment hole upper portion 57 and larger than the diameter of the small-diameter portion 64A. The medium-diameter portion 63A connects the large-diameter portion 62A and the small-diameter portion 64A. The small-diameter portion 64A is formed in a circular columnar shape. The small-diameter portion 64A has the same diameter (including substantially the same diameter) as the diameter of the attachment hole lower portion 56 of the attachment hole 55. The diameter of the medium-diameter portion 63A is slightly larger than the diameter of the small-diameter portion 64A (that is, the diameter of the attachment hole lower portion 56). In this embodiment, the diameter of the medium-diameter portion 63A is larger than the diameter of the small-diameter portion 64A by about 0.04 to about 0.06 mm. Accordingly, the medium-diameter portion 63A is press-fitted into an upper end portion 56a of the attachment hole lower portion 56.

In assembling the flow channel switching valve 2, as illustrated in FIG. 10A, the potentiometer shaft 60A is inserted into the attachment hole 55 of the valve stem 50. The diameter of the small-diameter portion 64A of the potentiometer shaft 60A is the same as the diameter of the attachment hole lower portion 56 serving as the guide portion. The outer peripheral surface of the small-diameter portion 64A comes into contact with the inner peripheral surface of the attachment hole lower portion 56 slidably in the insertion direction and the circumferential direction. Moreover, the diameter of the large-diameter portion 62A of the potentiometer shaft 60A is the same as the diameter of the attachment hole upper portion 57 serving as the guide portion. The outer peripheral surface of the large-diameter portion 62A comes into contact with the inner peripheral surface of the attachment hole upper portion 57 slidably in the insertion direction and the circumferential direction. As described above, since the small-diameter portion 64A and the attachment hole lower portion 56, and the large-diameter portion 62A and the attachment hole upper portion 57 are provided, it is possible to prevent the potentiometer shaft 60A from being inserted in an inclined manner with respect to the valve stem 50, and the potentiometer shaft 60A is guided along the axis L coaxially with the valve stem 50. Then, as illustrated in FIG. 10B, when the potentiometer shaft 60A is further inserted, the medium-diameter portion 63A is press-fitted into the upper end portion 56a of the attachment hole lower portion 56 serving as a press-fit portion. Thus, the potentiometer shaft 60A is fixed to the valve stem 50. The upper end portion 56a functions as a guide portion and a press-fit portion.

The flow channel switching valve 2 of the second embodiment also has the functions and effects similar to or the same as those of the flow channel switching valve 1 of the first embodiment described above.

In particular, in the flow channel switching valve 2, the upper end portion 56a of the attachment hole lower portion 56 serving as the press-fit portion into which the medium-diameter portion 63A is press-fitted is provided in the attachment hole 55. The attachment hole 55 is provided with the attachment hole lower portion 56 and the attachment hole upper portion 57 as two guide portions with which the small-diameter portion 64A and the large-diameter portion 62A come into contact slidably in the axial direction and the circumferential direction. With this configuration, in the flow channel switching valve 2, the small-diameter portion 64A and the large-diameter portion 62A come into contact with the two guide portions to guide the movement of the potentiometer shaft 60A. Thus, it is possible to more effectively prevent the potentiometer shaft 60A from being press-fitted into the valve stem 50 in an inclined manner.

Although the embodiments of the present invention have been described above, the present invention is not limited to these embodiments. Those skilled in the art may appropriately perform addition, deletion, or design change of a component with respect to the above-described embodiments, or may appropriately combine features of the embodiments. The modified or combined embodiments are included in the scope of the present invention as long as not impairing the gist of the present invention.

REFERENCE SIGNS LIST 1, 2 . . . flow channel switching valve, 10 . . . valve body, 10a . . . left wall portion, 10b . . . front wall portion, 10c . . . right wall portion, 11 . . . first flow channel, 12 . . . second flow channel, 13 . . . third flow channel, 11a, 12a, 13a . . . opening, 14 . . . valve chamber, 20 . . . ball valve member, 21 . . . first opening, 22 . . . second opening, 23 . . . third opening, 24 . . . valve stem insertion hole, 25 . . . switching flow path, 30 . . . seat member, 30a . . . annular groove, 31 . . . sealing member, 40 . . . drive unit, 41 . . . gear, 41a . . . through hole, 41b . . . upper surface, 43 . . . lower case, 43a . . . bottom wall, 43b . . . inner peripheral wall portion, 45 . . . bearing portion, 50 . . . valve stem, 51 . . . circular columnar portion, 51a . . . planar portion, 51b . . . end surface, 52 . . . angular columnar portion, 53 . . . stopper portion, 54 . . . O-ring, 55 . . . attachment hole, 56 . . . attachment hole lower portion, 56a . . . upper end portion, 57 . . . attachment hole upper portion, 57a . . . upper end portion, 60 . . . potentiometer shaft, 61 . . . fitting shaft portion, 62 . . . large-diameter portion, 63 . . . medium-diameter portion, 64 . . . small-diameter portion, 70 . . . potentiometer base, 71 . . . base body portion, 72 . . . meter attachment portion, 72a . . . bottom wall portion, 72b . . . peripheral wall portion, 72c . . . recess, 72d . . . through hole, 80 . . . potentiometer, 81 . . . rotor, 81a . . . fitting hole, 82 . . . meter body portion

The invention claimed is:

1. A flow channel switching valve including a valve body provided with a valve chamber and a plurality of flow channels that communicate with the valve chamber, a valve member that is rotatably housed in the valve chamber and that switches connection of the flow channels in accordance with a rotational position, a valve stem that is attached to the valve member along a rotation axis of the valve member, and a drive unit that rotates the valve member via the valve stem, the flow channel switching valve comprising:
   a rotation angle output shaft that is press-fitted into an attachment hole provided in an end surface of the valve stem; and
   a rotation angle detection unit that detects a rotation angle of the rotation angle output shaft around the rotation axis,
   wherein the rotation angle output shaft has a small-diameter portion, a medium-diameter portion, and a large-diameter portion that are sequentially connected in a direction of the rotation axis, and is supported rotatably around the rotation axis in the attachment hole in an inserted state before being press-fitted into the attachment hole, and
   wherein the attachment hole is provided with a press-fit portion into which one portion of the small-diameter portion, the medium-diameter portion, and the large-diameter portion is press-fitted.

2. The flow channel switching valve according to claim 1, wherein the valve stem is press-fitted into a through hole provided in a gear of the drive unit, and
   wherein the press-fit portion is provided at a position shifted from the gear in the direction of the rotation axis.

3. The flow channel switching valve according to claim 2, wherein the attachment hole has a guide portion with which at least one of other portions of the small-diameter portion, the medium-diameter portion, and the large-diameter portion except the portion that is press-fitted into the press-fit portion comes into contact slidably in an axial direction and a circumferential direction.

4. The flow channel switching valve according to claim 3, wherein the guide portion is provided to be shifted from the gear in the direction of the rotation axis.

5. The flow channel switching valve according to claim 4, wherein the guide portion is provided to be shifted in the direction of the rotation axis from a bearing portion that rotatably supports the valve stem.

6. The flow channel switching valve according to claim 3, wherein the guide portion is provided to be shifted in the direction of the rotation axis from a bearing portion that rotatably supports the valve stem.

7. The flow channel switching valve according to claim 1, wherein the attachment hole is provided with the press-fit portion into which the medium-diameter portion is press-fitted, and two guide portions with which the small-diameter portion and the large-diameter portion come into contact slidably in an axial direction and a circumferential direction.

* * * * *